(12) United States Patent
Chang

(10) Patent No.: US 11,400,496 B1
(45) Date of Patent: Aug. 2, 2022

(54) DRY LASER CLEANING APPARATUS AND PROCESS THEREOF

(71) Applicant: UNICE E-O SERVICES INC., Taoyuan (TW)

(72) Inventor: Chih-Nien Chang, Taoyuan (TW)

(73) Assignee: Unice E-O Services Inc., Taoyuan (TW)

( * ) Notice: Subject to any disclaimer, the term of this patent is extended or adjusted under 35 U.S.C. 154(b) by 0 days.

(21) Appl. No.: 17/212,206

(22) Filed: Mar. 25, 2021

(51) Int. Cl.
*B08B 7/00* (2006.01)
*B23K 26/352* (2014.01)
*B08B 15/02* (2006.01)

(52) U.S. Cl.
CPC ............ *B08B 7/0042* (2013.01); *B08B 15/02* (2013.01); *B23K 26/352* (2015.10)

(58) Field of Classification Search
None
See application file for complete search history.

(56) References Cited

U.S. PATENT DOCUMENTS

| | | | |
|---|---|---|---|
| 2017/0129180 A1* | 5/2017 | Coates | B29C 64/25 |
| 2017/0235293 A1* | 8/2017 | Shapiro | B23K 26/082 700/166 |

* cited by examiner

*Primary Examiner* — Eric W Golightly
(74) *Attorney, Agent, or Firm* — Bradley J. Thorson; DeWitt LLP

(57) ABSTRACT

A dry laser cleaning apparatus and a process thereof are provided. The dry laser cleaning apparatus includes a machine base, a laser cleaning module and a shielding housing. A base material is mainly placed on an object support platform of the machine base, so that a control module drives first parallel axial track groups, a second parallel axial track group and a vertical axial track group to move an optical fiber laser knife device of the laser cleaning module, and the optical fiber laser knife device irradiates a surface of the base material to clean the base material. Meanwhile, a height sensor device of the laser cleaning module and an orientation sensor device of the shielding housing are used to sense a position and a height of a to-be-cleaned object, so that the optical fiber laser knife device can automatically focus on the base material to optimize a cleaning effect.

11 Claims, 8 Drawing Sheets

DRY LASER CLEANING APPARATUS AND PROCESS THEREOF

BACKGROUND OF THE INVENTION

(1) Field of the Invention

This invention relates to a dry laser cleaning apparatus and a process thereof, and more particularly to a cleaning apparatus structure using a laser beam to clean a base material, and a process thereof.

(2) Description of the Prior Art

Using laser to clean pollutants accumulated or contaminated onto a surface of a special base material (or metal material) is widely used. At present, the most frequently used method is to use a robot arm to hold a laser source, and the robot arm moves the laser source to clean the base material. However, the moving height and speed of the robot arm are restricted, and cannot achieve the optimum cleaning effect to the base material having the higher height or even cannot perform the cleaning. In addition, the currently widely used laser source is the semiconductor pump solid laser source, which cannot automatically focus, and needs replacement and calibration of components, including a laser resonant cavity, after being used for a period of time. The replacement processes are tedious and complicated. Furthermore, because toxic substances and heavy metal dusts are produced when the laser cleaning is performed, the currently applied laser cleaning apparatuses cannot collect the produced dusts in an effective and concentrated manner, so that the operators are exposed to the dangerous working environment for a long time. So, how to improve the above-mentioned drawback and problem is the technical difficulty that the inventor of this case wants to solve.

SUMMARY OF THE INVENTION

A main objective of this invention is to provide a dry laser cleaning apparatus composed of a machine base, a laser cleaning module and a shielding housing, wherein a base material is mainly placed on an object support platform of the machine base, so that a control module drives first parallel axial track groups, a second parallel axial track group and a vertical axial track group to move an optical fiber laser knife device of the laser cleaning module, and the optical fiber laser knife device irradiates a surface of the base material to clean the base material. Meanwhile, a height sensor device of the laser cleaning module and an orientation sensor device of the shielding housing are used to sense a position and a height of a to-be-cleaned object, so that the optical fiber laser knife device can automatically focus on the base material to optimize a cleaning effect.

DETAILED DESCRIPTION OF THE PREFERRED EMBODIMENTS

Figure 1:
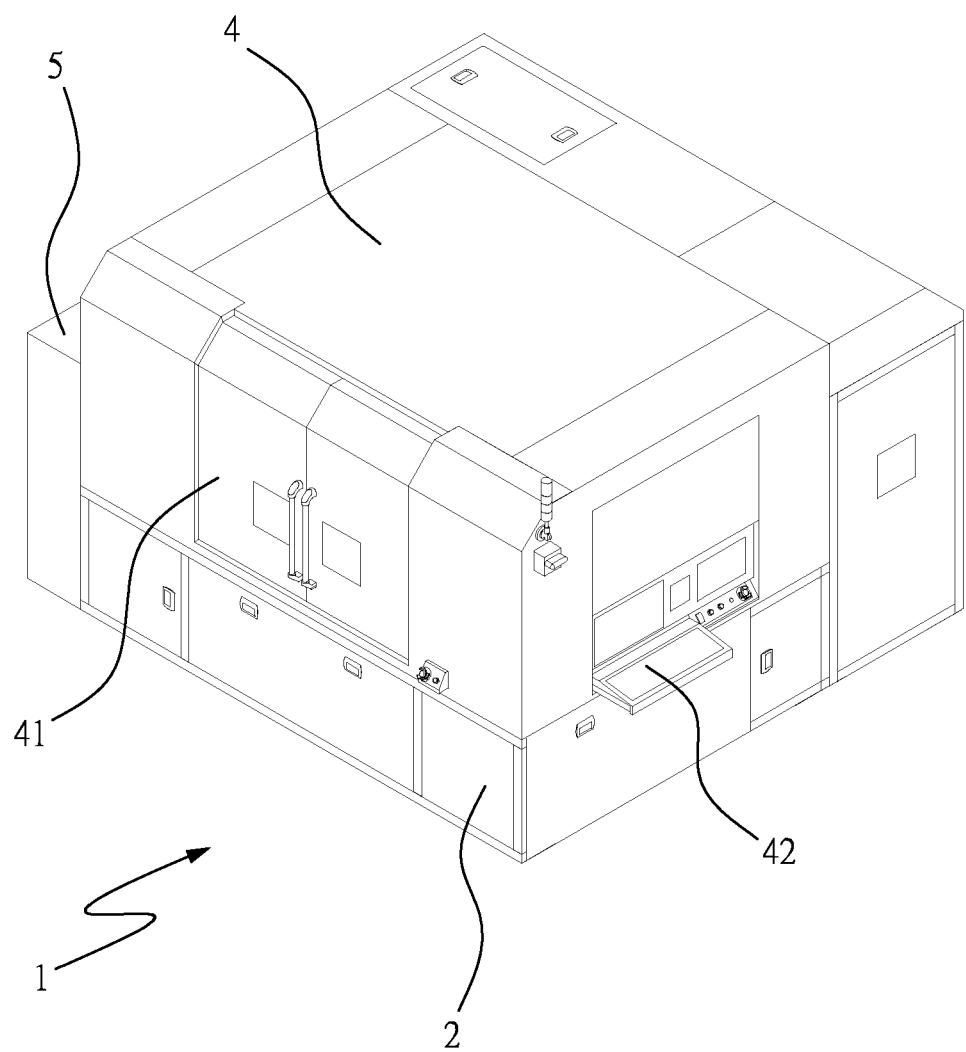
FIG. 1 is a pictorial outlook view showing this invention.
Figure 2:
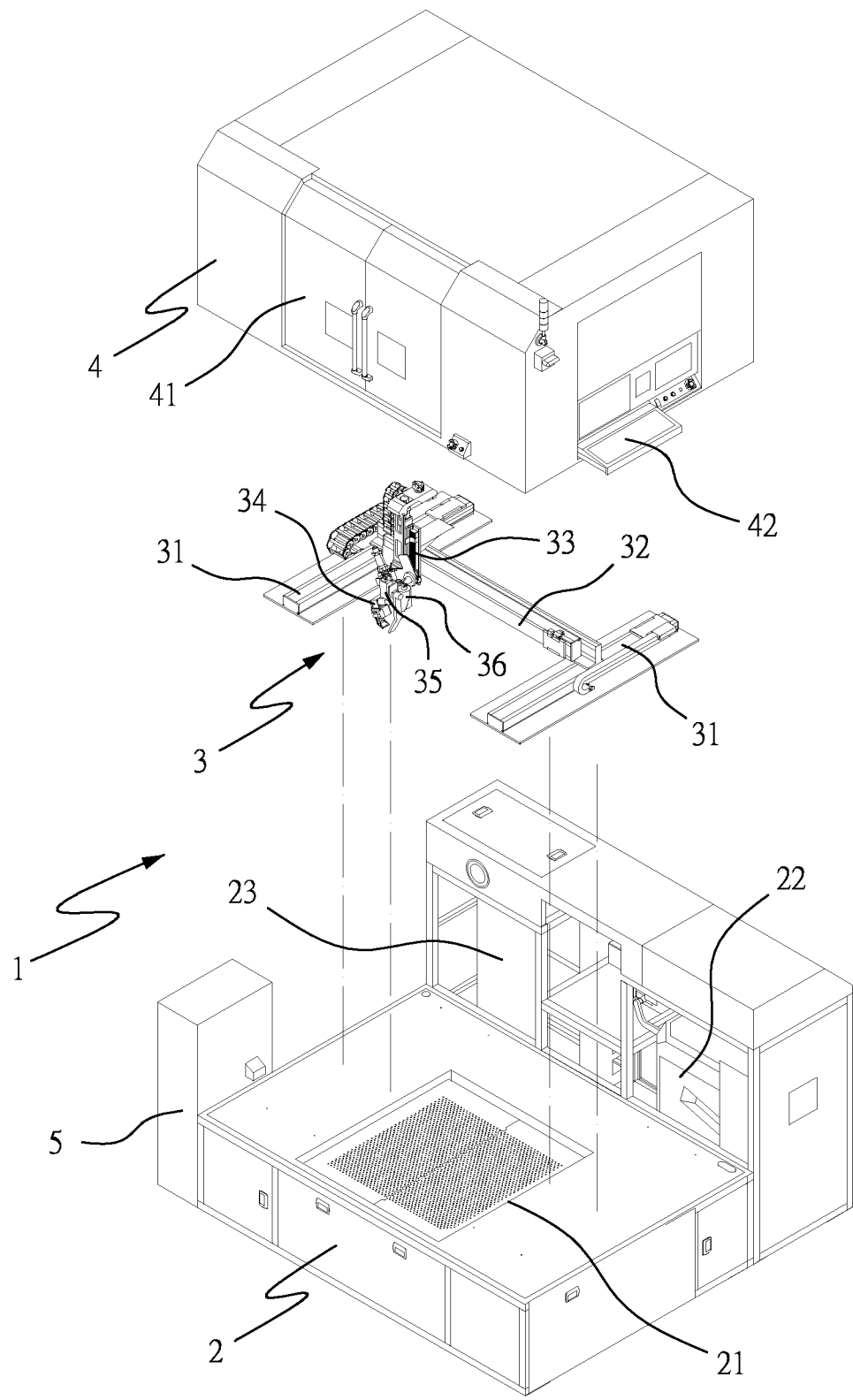
FIG. 2 is a pictorially exploded view showing this invention.
Figure 3:
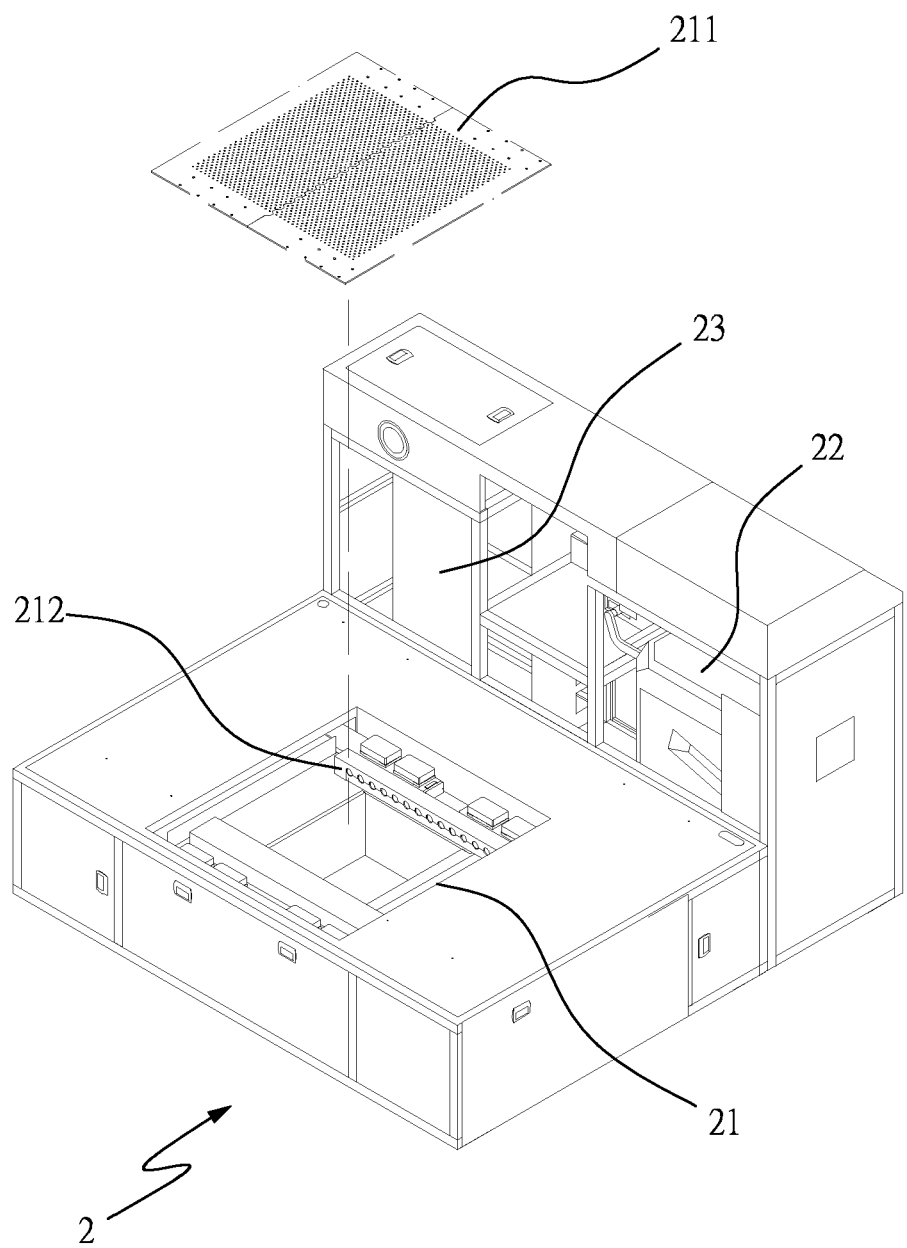
FIGS. 3 to 5 are partial schematic views showing this invention.
Figure 4:
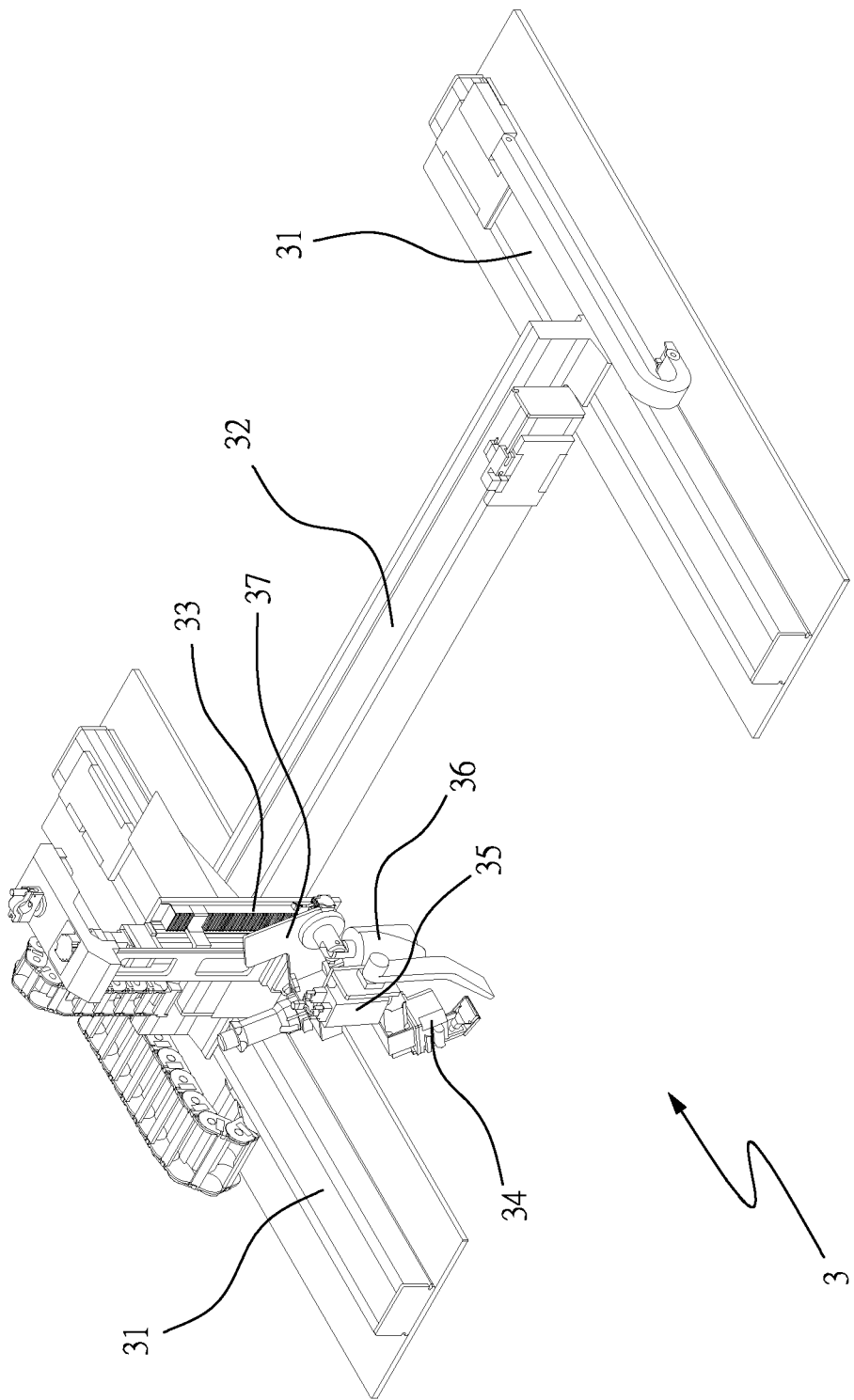
Figure 5:
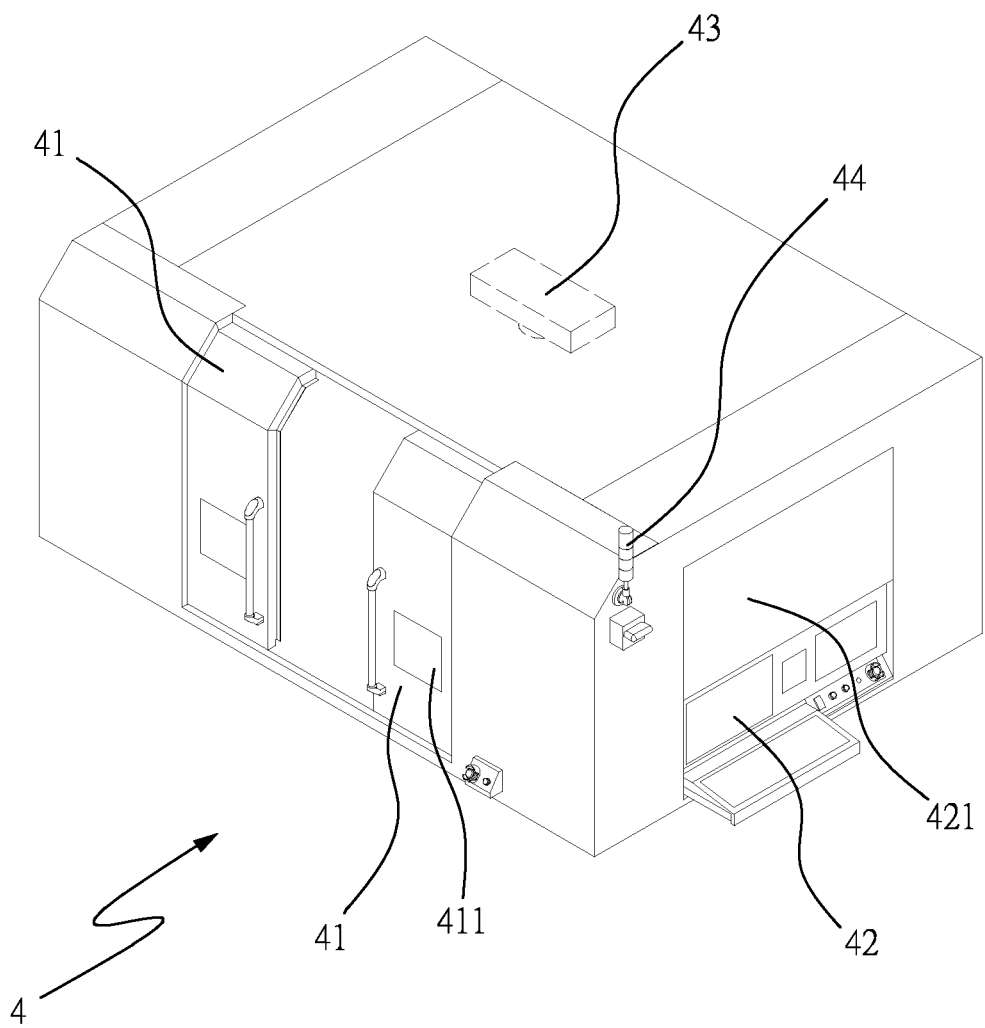
Figure 6:
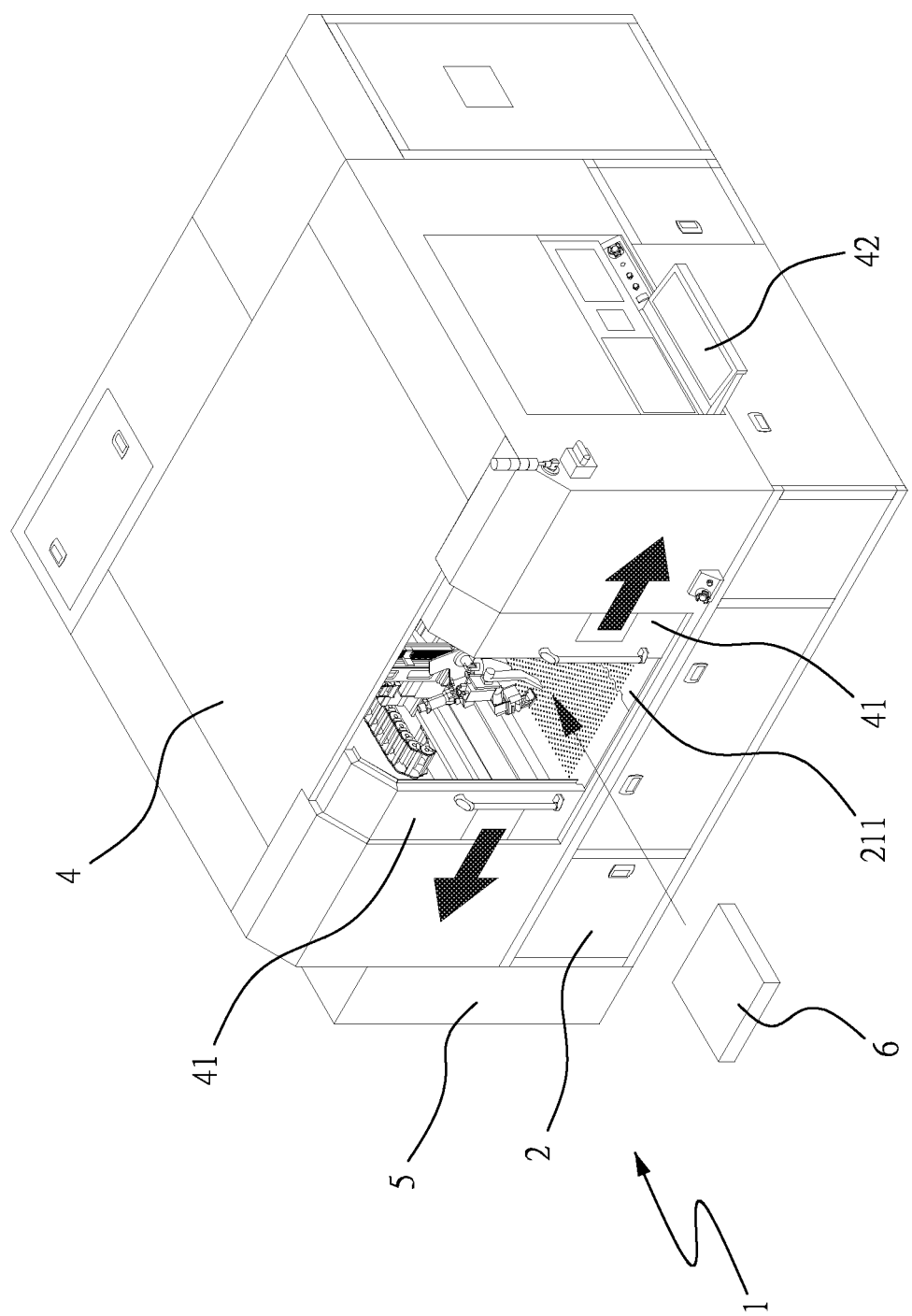
FIGS. 6 and 7 are schematic views showing a preferred embodiment of this invention.
Figure 7:
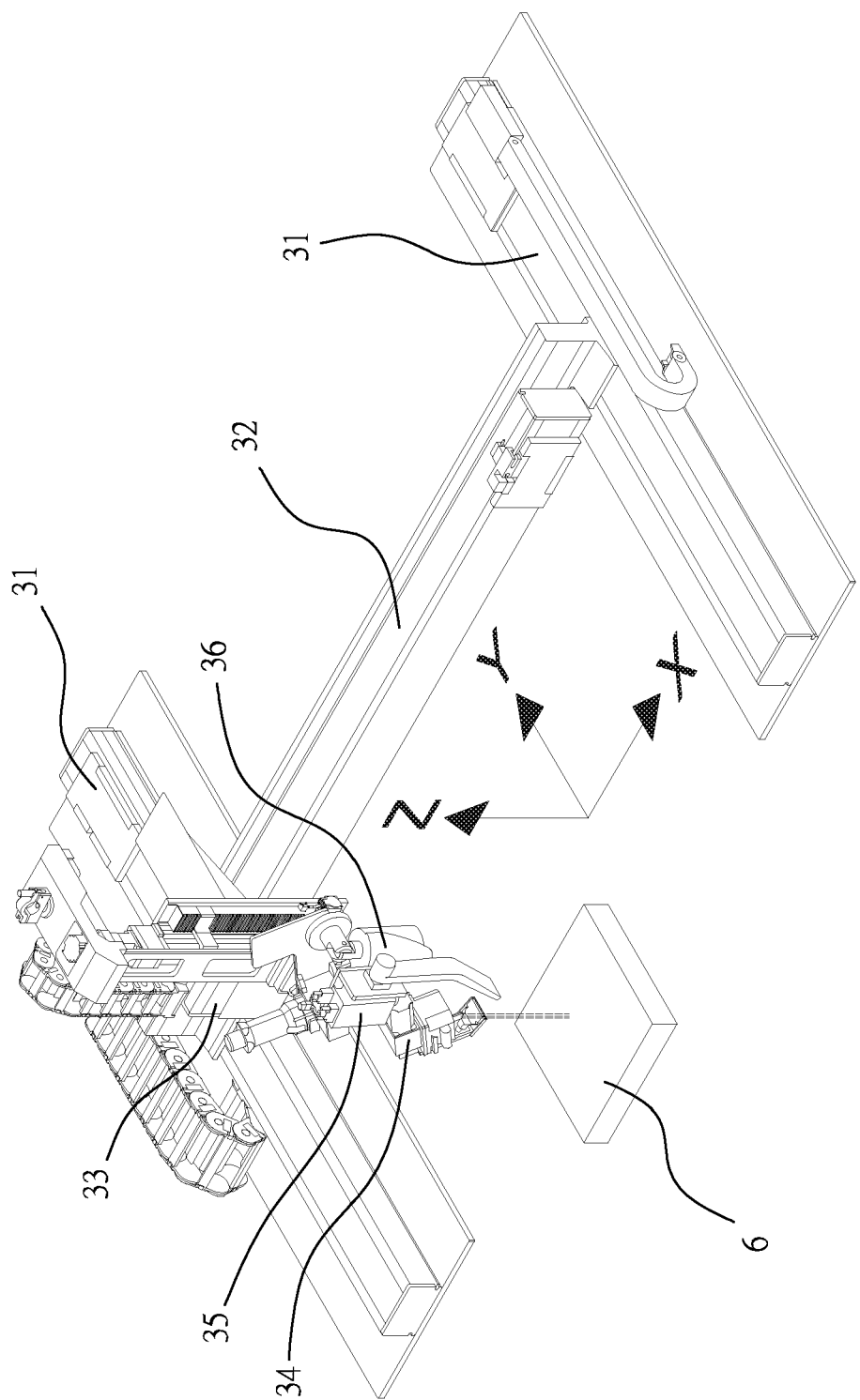
Figure 8:
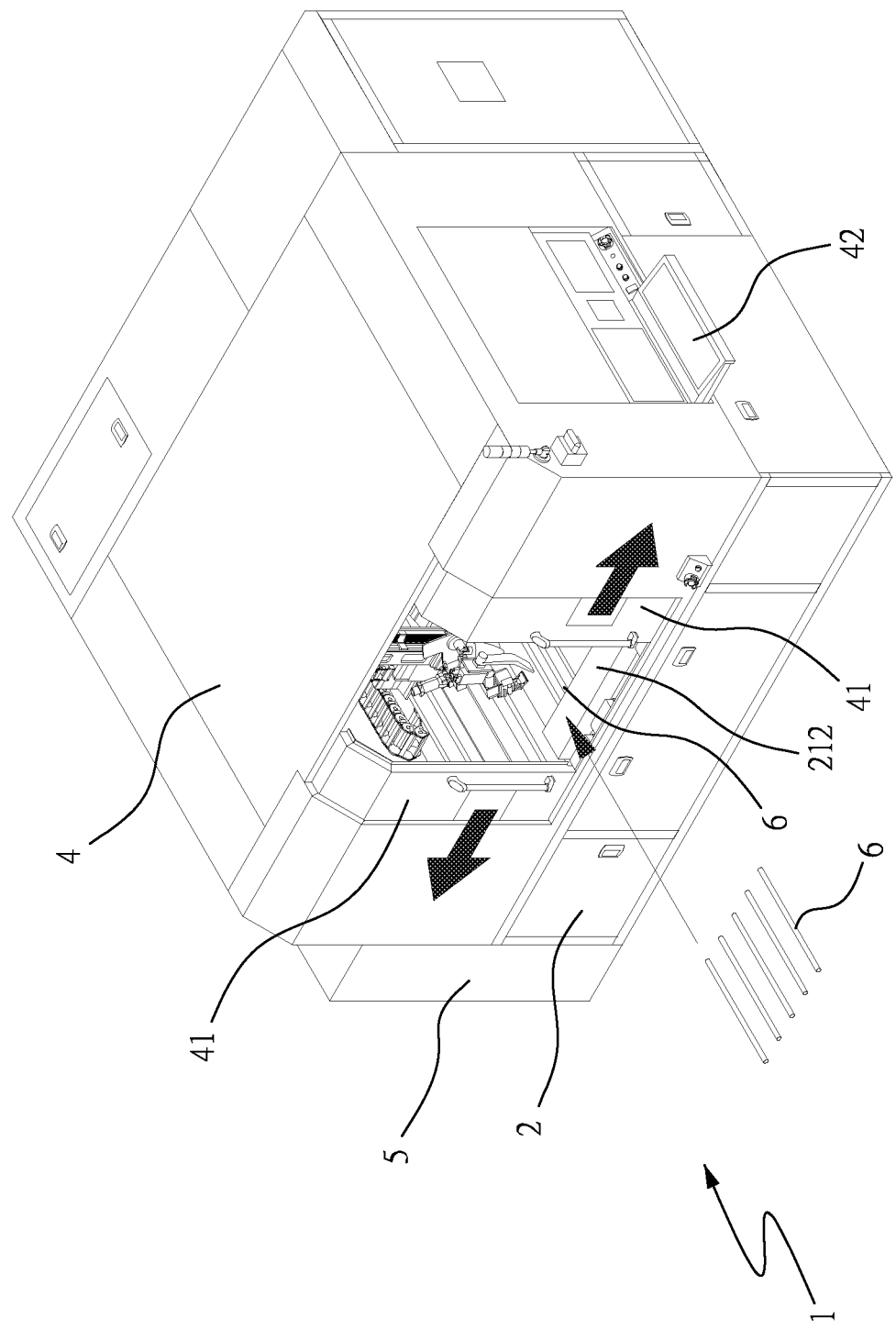
FIG. 8 is a schematic view showing another preferred embodiment of this invention.

FIG. 1 is a pictorial outlook view showing this invention. FIG. 2 is a pictorially exploded view showing this invention. FIGS. 3 to 5 are partial schematic views showing this invention. FIGS. 6 and 7 are schematic views showing a preferred embodiment of this invention. FIG. 8 is a schematic view showing another preferred embodiment of this invention. Referring to FIGS. 1 to 8, a dry laser cleaning apparatus 1 of this invention mainly includes a machine base 2, a laser cleaning module 3, a shielding housing 4 and an air filtering device 5.

An object support platform 21 is disposed on the machine base 2. An optical fiber laser knife module 22 and a power supply module 23 are additionally disposed in the object support platform 21.

The laser cleaning module 3 is disposed on the object support platform 21 of the machine base 2, and includes two first parallel axial track groups 31, a second parallel axial track group 32, a vertical axial track group 33, an optical fiber laser knife device 34, a height sensor device 35 and an image acquiring device 36.

The shielding housing 4 is for covering the object support platform 21 of the machine base 2. Two protection sliding doors 41 and a control module 42 are provided on an outer side of the shielding housing 4. An orientation sensor device 43 is disposed above an inner side of the shielding housing 4.

The air filtering device 5 is disposed on one side of the machine base 2, is connected to the shielding housing 4, and is for filtering the air in the shielding housing 4.

The object support platform 21 of the machine base 2 includes a flatbed 211 and a rotating device 212.

The vertical axial track group 33 is disposed on the second parallel axial track group 32, and the second parallel axial track group 32 is disposed across the two first parallel axial track groups 31.

The optical fiber laser knife device 34, the height sensor device 35 and the image acquiring device 36 are disposed on the vertical axial track group 33 through a fine tuning mechanism 37.

The first parallel axial track groups 31 can perform front-rear reciprocating in a Y-axis direction.

The second parallel axial track group 32 can perform left-right reciprocating in an X-axis direction.

The vertical axial track group 33 can perform up-down reciprocating in a Z-axis direction.

At least one observation window 411 is disposed on one or each of the protection sliding doors 41.

The control module 42 further includes an image display device 421.

An alarm device 44 is additionally disposed on the shielding housing 4.

When the dry laser cleaning apparatus 1 of this invention is used, the protection sliding doors 41 of the shielding housing 4 are opened firstly so that a base material 6 can be placed on the flatbed 211 of the object support platform 21 of the machine base 2. Then, the protection sliding doors 41 are closed, and the control module 42 drives the laser cleaning module 3 in the shielding housing 4 so that the optical fiber laser knife device 34 of the laser cleaning module 3 cleans the base material 6.

As mentioned hereinabove, after the base material 6 has been placed on the flatbed 211 of the machine base 2, the orientation sensor device 43 firstly senses the position of the base material 6, and then the height sensor device 35 senses the height of the base material 6. The information of the sensed and collected position and height will be transmitted to the control module 42. The control module 42 performs calculations and then drives the first parallel axial track groups 31, the second parallel axial track group 32 and the vertical axial track group 33 to move the optical fiber laser knife device 34 to clean the surface of the base material 6.

The first parallel axial track groups 31 move the second parallel axial track group 32, the second parallel axial track group 32 moves the vertical axial track group 33, and the vertical axial track group 33 moves the optical fiber laser knife device 34 thereon. Because the first parallel axial track group 31 can move in the Y-axis direction, the second parallel axial track group 32 can move in the X-axis direction, and the vertical axial track group 33 can move in the Z-axis direction, the optical fiber laser knife device 34 can be moved to reciprocate in the front, rear, left, right, up and down directions.

In addition, the optical fiber laser knife device 34, the height sensor device 35 and the image acquiring device 36 are disposed on the vertical axial track group 33 through the fine tuning mechanism 37, and are mainly for the purpose that the angles of the optical fiber laser knife device 34, the height sensor device 35 and the image acquiring device 36 can be finely adjusted through the fine tuning mechanism 37.

In addition, when the control module 42 performs the calculation according to the information of the position and the height of the base material 6 sensed and collected by the orientation sensor device 43 and the height sensor device 35, the dimensional size and the shape of the base material 6 can be further determined. So, the irradiating distance and path of the optical fiber laser knife device 34 on the base material 6 can be accurately controlled to achieve the optimum cleaning efficiency;

In addition, the control module 42 can control the optical fiber laser knife module 22 to drive the optical fiber laser knife device 34 to perform irradiating, the irradiating frequency and range of the optical fiber laser knife device 34 can be adjusted through the optical fiber laser knife module 22.

In addition, the image acquiring device 36 additionally disposed on the vertical axial track group 33 is mainly used to continuously photograph the cleaning process, and the cleaning process can be displayed through the image display device 421 of the control module 42 so that the operator can monitor the cleaning condition at any time.

In addition to controlling of the laser cleaning module 3 to perform the cleaning operation, the control module 42 can further monitor and detect the temperature and smog conditions in the cleaning operation, and the temperature and smog conditions can be displayed through the image display device 421 of the control module 42 at the same time.

In addition, because the toxic substances and heavy metal dusts are produced in the cleaning process, the air filtering device 5 disposed on one side of the machine base 2 can be used to filter the air in the shielding housing 4, and collect the produced dusts to prevent the operator from contacting the dusts after the operator opens the protection sliding doors 41, so that the effective protecting objective can be obtained.

In addition, this invention adopts the optical fiber laser knife module 22 mainly for the following purposes. Because the optical fiber laser knife module 22 does not have the components of the laser resonant cavity, the tedious processes of replacing and calibrating the laser resonant cavity can be avoided, and the optical fiber laser knife module 22 further has the advantages of resisting the vibration, saving the power, lengthening the service life, increasing the light conversion rate, decreasing the transmission loss and lowing the maintenance cost.

In addition, the alarm device 44 additionally disposed on the shielding housing 4 is mainly for the purpose of providing the alarm in the form of light or audio warming message through the alarm device 44 to notify the operator when the dry laser cleaning apparatus 1 has the abnormal condition.

In addition, as shown in FIG. 8, when the base material 6 includes columnar or stick-shaped objects, the flatbed 211 of the object support platform 21 can be removed, and the columnar or stick-shaped objects of the base material 6 can be attached to the rotating device 212 of the object support platform 21. When the first parallel axial track groups 31, the second parallel axial track group 32 and the vertical axial track group 33 move the optical fiber laser knife device 34 to irradiate the base material 6, the rotating device 212 can rotate the columnar or stick-shaped objects of the base material 6, so that the optical fiber laser knife device 34 can uniformly irradiate all surfaces of the base material 6;

In summary, compared with various drawbacks and unsolvable problems present in the conventional laser cleaning apparatus, the dry laser cleaning apparatus 1 of this invention utilizes the designs of the first parallel axial track groups 31, the second parallel axial track group 32 and the vertical axial track group 33, and the dimension and specification of the base material 6 can be calculated accurately through the sensing of the height sensor device 35 and the orientation sensor device 43, so that the optimum cleaning effect can be obtained. Furthermore, the optimum cleaning environment can be obtained to provide the safest working environment for the operator through the monitoring of the optical fiber laser knife module 22 and the filtering of the air filtering device 5.

The operator mainly operates the control module 42 to clean the base material 6, and the main process includes (a) performing image analyzing; (b) performing laser cleaning; and (c) performing air filtering.

In the step of performing image analyzing, after the base material 6 has been placed on the object support platform 21 of the machine base 2, the orientation sensor device 43 and the height sensor device 35 sense the position and height of the base material 6, and the control module 42 analyzes the collected information.

In the step of performing laser cleaning, the control module 42 plans the paths of the first parallel axial track groups 31, the second parallel axial track group 32 and the vertical axial track group 33 according to the analyzed information, so that the optical fiber laser knife device 3 cleans the base material 6, and the optical fiber laser knife device 3 moves to the corresponding height according to the height of the base material 6. In addition, the image analyzing process has been completely before the cleaning process, and will not be performed again in the cleaning process.

In the step of performing air filtering, after the base material 6 has been cleaned and before the protection sliding doors 41 of the shielding housing 4 are opened, the air filtering device 5 disposed on one side of the machine base 2 filters the air in the shielding housing 4 and collects the dust produced upon cleaning the base material 6. Then, the protection sliding doors 41 can be opened after the filtering process ends.

The above-mentioned embodiments are used to illustrate the preferred embodiments of the present invention, and are not used to limit the scope of the present invention. Those skilled in the art can make some changes and modifications without departing from the spirit and scope of the present invention. Therefore, the scope of the invention is based on the attached claims.

What is claimed is:

1. A dry laser cleaning apparatus, comprising:
a machine base, on which an object support platform is disposed, wherein an optical fiber laser knife module and a power supply module are additionally disposed in the machine base;
a laser cleaning module disposed on the object support platform of the machine base, wherein the laser cleaning module comprises two first parallel axial track groups, a second parallel axial track group, a vertical axial track group, an optical fiber laser knife device, a height sensor device and an image acquiring device;
a shielding housing for covering the object support platform of the machine base, wherein an outer side of the shielding housing is provided with two protection sliding doors and a control module, and an orientation sensor device is disposed above an inner side of the shielding housing; and
an air filtering device, which is disposed on one side of the machine base, is connected to the shielding housing, and filters air in the shielding housing.

2. The dry laser cleaning apparatus according to claim 1, wherein the object support platform of the machine base comprises a flatbed and a rotating device.

3. The dry laser cleaning apparatus according to claim 1, wherein the vertical axial track group is disposed on the second parallel axial track group, and the second parallel axial track group is disposed across the two first parallel axial track groups.

4. The dry laser cleaning apparatus according to claim 1, wherein the optical fiber laser knife device, the height sensor device and the image acquiring device are disposed on the vertical axial track group through a fine tuning mechanism.

5. The dry laser cleaning apparatus according to claim 1, wherein the first parallel axial track groups can perform front-rear reciprocating in a Y-axis direction.

6. The dry laser cleaning apparatus according to claim 1, wherein the second parallel axial track group can perform left-right reciprocating in an X-axis direction.

7. The dry laser cleaning apparatus according to claim 1, wherein the vertical axial track group can perform up-down reciprocating in a Z-axis direction.

8. The dry laser cleaning apparatus according to claim 1, wherein at least one observation window is disposed on one or each of the protection sliding doors.

9. The dry laser cleaning apparatus according to claim 1, wherein the control module further comprises an image display device.

10. The dry laser cleaning apparatus according to claim 1, wherein an alarm device is additionally disposed on the shielding housing.

11. A dry laser cleaning process using the dry laser cleaning apparatus according to claim 1, the dry laser cleaning process comprising: performing image analyzing, performing laser cleaning and performing air filtering.

* * * * *